(12) United States Patent
Feng et al.

(10) Patent No.: US 12,242,441 B1
(45) Date of Patent: *Mar. 4, 2025

(54) DATA LINEAGE TRACKING

(71) Applicant: Databricks, Inc., San Francisco, CA (US)

(72) Inventors: Tao Feng, Foster City, CA (US); Menglei Sun, Mountain View, CA (US); Zhuoying Wang, Santa Clara, CA (US)

(73) Assignee: Databricks, Inc., San Francisco, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 18/162,562

(22) Filed: Jan. 31, 2023

Related U.S. Application Data

(63) Continuation of application No. 17/862,158, filed on Jul. 11, 2022.

(51) Int. Cl.
| | |
|---|---|
| *G06F 16/28* | (2019.01) |
| *G06F 11/07* | (2006.01) |
| *G06F 16/215* | (2019.01) |
| *G06F 16/22* | (2019.01) |
| *G06F 16/23* | (2019.01) |
| *G06F 16/906* | (2019.01) |
| *G06F 17/18* | (2006.01) |

(52) U.S. Cl.
CPC ........ *G06F 16/215* (2019.01); *G06F 11/0793* (2013.01); *G06F 16/2246* (2019.01); *G06F 16/2365* (2019.01)

(58) Field of Classification Search
CPC .......... G06F 16/24542; G06F 16/2453; G06F 16/2454; G06F 16/24547; G06F 16/2455; G06F 16/285; G06F 17/18; G06F 16/906
See application file for complete search history.

(56) References Cited

U.S. PATENT DOCUMENTS

| | | | | |
|---|---|---|---|---|
| 2003/0218639 | A1* | 11/2003 | Lee ....................... | G06F 3/0481 715/853 |
| 2009/0182706 | A1* | 7/2009 | Olston ................ | G06F 16/2453 |
| 2011/0137922 | A1* | 6/2011 | Cushing ............ | G06F 16/24542 707/755 |

(Continued)

FOREIGN PATENT DOCUMENTS

| | | | | | |
|---|---|---|---|---|---|
| WO | WO-2015087034 | A1 * | 6/2015 | .......... | G06F 11/3684 |
| WO | WO-2020264319 | A1 * | 12/2020 | ............ | G06F 11/079 |

OTHER PUBLICATIONS

United States Office Action, U.S. Appl. No. 17/862,158, filed Oct. 2, 2023, 24 pages.

(Continued)

*Primary Examiner* — Dennis Truong
(74) *Attorney, Agent, or Firm* — Fenwick & West LLP

(57) ABSTRACT

The present application discloses a method, system, and computer system for managing lineage data for data entities. The method includes generating lineage data, wherein generating the lineage data, and storing and indexing, in a data structure, the lineage data in association with the selected data entity. The generating the lineage data includes selecting a selected data entity, obtaining a query tree that was used to generate the selected data entity, and determining lineage data for the selected data entity based at least in part on the query tree.

20 Claims, 11 Drawing Sheets

(56) References Cited

U.S. PATENT DOCUMENTS

| | | | |
|---|---|---|---|
| 2015/0254295 A1* | 9/2015 | Harding | G06F 16/243 |
| | | | 707/690 |
| 2016/0364434 A1* | 12/2016 | Spitz | G06F 16/24568 |
| 2017/0054736 A1* | 2/2017 | Krishnamurthy | G06F 21/6209 |
| 2017/0126702 A1* | 5/2017 | Krishnamurthy | G06F 21/604 |
| 2018/0129699 A1* | 5/2018 | Gould | G06F 16/288 |
| 2018/0181622 A1* | 6/2018 | Deshmukh | G06F 16/2308 |
| 2019/0026358 A1 | 1/2019 | Li | |
| 2020/0142990 A1* | 5/2020 | Freedman | G06F 16/2455 |
| 2020/0210427 A1* | 7/2020 | Dugan | G06F 21/6218 |
| 2020/0334277 A1* | 10/2020 | Doyle | G06F 16/211 |
| 2020/0409825 A1* | 12/2020 | Balasubramanian | |
| | | | G06F 11/3672 |
| 2020/0409831 A1* | 12/2020 | Balasubramanian | |
| | | | G06F 11/3688 |
| 2021/0334254 A1* | 10/2021 | Thompson | G06F 16/9024 |
| 2022/0253783 A1 | 8/2022 | Mookherjee | |
| 2022/0342866 A1* | 10/2022 | Kotwal | G06F 16/188 |

OTHER PUBLICATIONS

United States Office Action, U.S. Appl. No. 17/862,158, filed Feb. 6, 2024, 24 pages.

United States Office Action, U.S. Appl. No. 17/862,158, filed Jun. 28, 2024, 27 pages.

* cited by examiner

DATA LINEAGE TRACKING

CROSS-REFERENCE TO RELATED APPLICATIONS

This application is a continuation patent application of U.S. application Ser. No. 17/862,158, filed on Jul. 11, 2022, which is incorporated by reference herein in its entirety.

BACKGROUND OF THE INVENTION

A system for big data processing comprises a system for deployments of applications, configurations, one or more datasets, and model(s) used in connection with analyzing the data. Numerous data entities are generated in connection with the big data processing and the set of various data entities within the system have varying interdependencies. However, these interdependencies are typically not readily visible or knowable. This creates a problem when data corruption or updates become known in a dataset, and it is unclear which other data in the dataset have been corrupted or need updating as a result.

BRIEF DESCRIPTION OF THE DRAWINGS

Various embodiments of the invention are disclosed in the following detailed description and the accompanying drawings.

DETAILED DESCRIPTION

Figure 1:
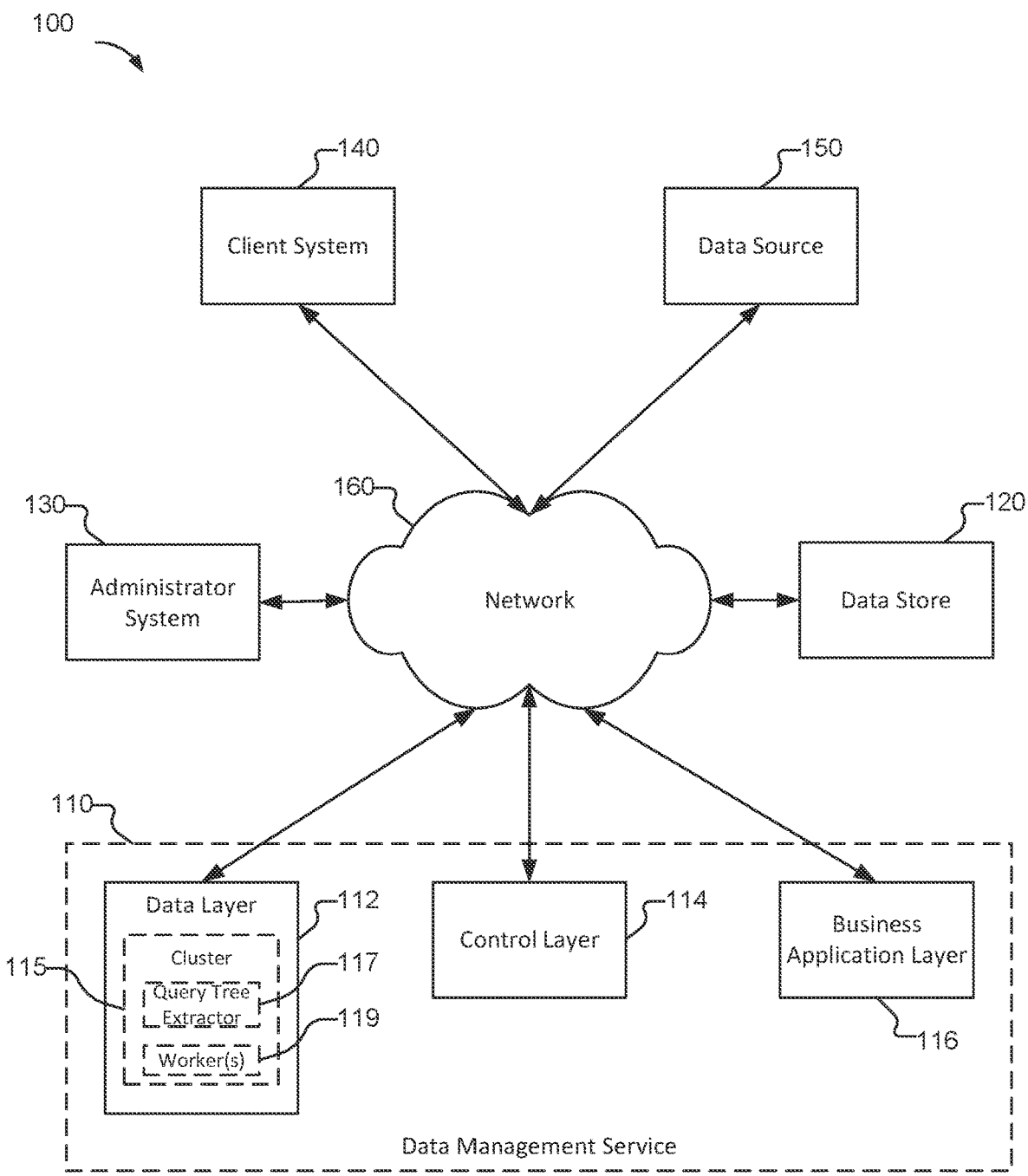
FIG. 1 is a block diagram of a system for managing data according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a data entity may include a table, a view, a column (e.g., of a table), a model (e.g., a machine learning model), a notebook, a job, a query, a dashboard, a file, or the like. A data entity may be various other data objects.

As used herein, lineage may correspond to a dependency between (or among) data entities. The lineage can include upstream dependencies and/or downstream dependencies.

As used herein, an upstream data entity (also referred to herein as an ancestor data entity) may correspond to a data entity with which another data entity has an interdependency. As an example, an upstream data entity corresponding to a particular data entity is a data entity that is a parent, grandparent, or other ancestor data entity for the particular data entity. As another example, an upstream data entity is a data entity from which generation of one or more other data entities (e.g., descendant data entities or downstream entities) depends. For example, the data entity may be sourced directly from an upstream data entity or calculated from the upstream data entity.

As used herein, a downstream data entity (also referred to herein as a descendant data entity) may correspond to a data entity with which another data entity has an interdependency. As an example, a downstream data entity is a data entity that is a child, grandchild, or other descendant data entity for another particular data entity (or data entities). As another example, a downstream data entity depends from one or more upstream data entities. As another example, a downstream data entity is generated based at least in part on information included in an ancestor data entity(ies) from which the downstream data entity depends.

A system and method for managing data entities is disclosed. In particular, a system and method for managing lineage data for data entities within a big data processing system is disclosed. In some embodiments, the system generates lineage data, and stores and indexes, in a data structure, the lineage data in association with the selected data entity. Generating the lineage data includes selecting a selected data entity, obtaining a query tree that was used to generate the selected data entity, and determining lineage data for the selected data entity based at least in part on the query tree. In some embodiments, the lineage data includes a field-level lineage for one or more fields in a data object (e.g., a data entity).

Related art systems for managing data generally implements a mechanism for determining information pertaining to lineage for a small set of data structures. The related art systems are generally structured query language (SQL) systems defined by a certain predefined SQL grammar. The SQL systems can pass information pertaining to the lineage of a particular data structure via SQL syntax using an SQL grammar. In response to determining that information pertaining to the lineage of a particular data structure is to be determined (e.g., requested), the lineage is extracted from the SQL syntax using the predefined SQL grammar.

Related art systems generally do not determine/provide lineage data for a data structure at fine granularity. For example, in the case of a data structure being a table, lineage data determined by related art systems merely includes the lineage between two tables. However, related art systems are not able to provide column-level lineage data of a table. In contrast, the system for data lineage tracking provides very fine granularity of lineage among data entities. For example, the system provides field-level lineage data for a data entity. Accordingly, various embodiments provide lineage data having higher resolution, which can be used to maintain consistency at a field-level among data entities having lineage.

Various embodiments use an internal data structure associated with processing a query to determine lineage data, such as lineage data for a data entity that is generated based on the query. Accordingly, various embodiments are more extensible than related art systems, which are restricted to SQL systems and which require a pre-defined SQL grammar.

According to various embodiments, lineage data is determined for a data entity based at least in part on a query tree for a query from which data entity is generated. In response to receiving a query, the system parses the query into the query tree. The system can parse the query to obtain the tree contemporaneous with receiving the query (e.g., in real time upon receipt of the query). For example, before the query is executed, the query is translated and parsed to determine the corresponding query tree. Nodes within a query tree can correspond to a certain operator being performed for the query. In some embodiments, the lineage data is extracted from the query tree based on a traversal of the query tree. The system uses the tree-node data structure to extract the lineage from the top of the query tree to the various higher-order nodes and branches to determine various data entities (e.g., tables, views, columns, etc.) that are created in the query tree (e.g., that are created during execution of the query). As an example, the system determines lineage data corresponding to a traversal between a root node and a leaf node (or preceding node in the query tree). In some embodiments, to achieve language agnostic lineage information, a program in a given language (e.g., SQL, python, scala, etc.) that represents difference entities' dependencies is converted into a query tree, and this query tree is then used to extract lineage information.

In response to determining the lineage data for a data entity, the system stores the lineage data. The lineage data can be persistently stored and may be used for responding to querying or determining corrective actions in response to a determination that a data entity is corrupted or otherwise updated or replaced or needs updating or needs replacing. The system stores the lineage data in association with the data entity. For example, the system determines (e.g., generates) a unique lineage identifier for the lineage data and stores the lineage identifier in association with a data entity identifier. The system can store a mapping of lineage identifiers to data entity identifiers. In some embodiments, the system stores the lineage data in association with a plurality of data entities such as one or more upstream data entities and/or one or more downstream data entities comprised in the corresponding lineage. For example, the system stores the lineage in association with applicable ancestor data entities and applicable descendant data entities. The system can further store the lineage data in association with one or more of a query, the query tree, and/or a node in the query tree (e.g., using a node identifier). The lineage data may be stored for a predetermined time (e.g., N days, where N is a positive integer set according to a user/customer preferences, etc.) or in accordance with a lineage retention policy.

The system can store various information for a data entity, such as a workspace entity (e.g., associated with an entity identifier) that generated the data entity or the query that gave rise to the entity, a meta store entity (e.g., associated with a meta store identifier) such as a store in which the data entity is stored, an entity type (e.g., associated with an entity type identifier), and the lineage data such as an indication of upstream data entities or downstream data entities included in the lineage data for the data entity.

According to various embodiments, the lineage data may be consumed by services and/or other systems, such as client systems in response to a user request. An example of a service or other system that consumes lineage data include (i) a service that detects corruption of a data entity, uses lineage data to determine impacted data entities such as downstream data entities, and causes a corrective action to be performed with respect to the downstream data, and/or (ii) a service that detects an update or replacement of a data entity, uses lineage data to determine impacted data entities, and causes a corrective action to be performed with respect to the impacted data entities. In some embodiments, the lineage data is exposed to the services or other systems via an application programming interface (API). As an example, a client system can use the API to query the system for lineage data for a particular data entity. As another example, a service that detects a corrupted data entity can use the API to query the system for lineage data for the corrupted data entity.

According to various embodiments, the system configures a representation of the lineage data for one or more data entities and provides the representation to another service or system. For example, the system can configure a user interface to include the lineage data and cause a client system to display the user interface with the lineage data. The representation of the lineage data depicts the lineage between/among data entities in an intuitive display illustrating the dependencies between/among the data entities.

FIG. 1 is a block diagram of a system for managing data according to various embodiments of the present application. According to various embodiments, system 100 implements at least part of process 400 of FIG. 4, process 500 of FIG. 5, process 600 of FIG. 6, process 700 of FIG. 7, process 800 of Figure, process 900 of FIG. 9A, and/or process 950 of FIG. 9B. System 100 can store or generate lineage 300 of FIG. 3A and/or lineage 350 of FIG. 3B.

In the example illustrated in FIG. 1, system 100 includes data management service 110, data store 120, administrator system 130, client system 140, and/or data source 150. In some embodiments, data management service 110 and/or data source 150 are integrated (e.g., combined into a layer or a single set of servers). System 100 further includes one or more networks such as network 160 over which administrator system 130 and/or client system 140 communicates with data management service 110, data store 120, and/or data source 150. In various embodiments, network 160 includes one or more of a wired network, and/or a wireless network such as a cellular network, a wireless local area network (WLAN), or any other appropriate network. System 100 may include various other systems or devices.

In some embodiments, data management service 110 comprises data layer 112, control layer 114, and business application layer 116. Data layer 112, control layer 114, and/or business application layer 116 can be respectively implemented by one or more servers. In some implementations, data layer 112, control layer 114, and/or business application layer 116 by a same set of one or more servers. In some embodiments, system 100 comprises a plurality of data layers that respectively process data pertaining to various tenants or clients. For example, each data layer can be implemented for a different tenant or clients.

According to various embodiments, data management service 110 manages data with respect to one or more datasets. Data management service 110 can receive requests to store or obtain data for one or more datasets from client system 140 and/or data source 150. Client system 140 and/or data source 150 can be connected to data management service 110 via a connector, such as an application programming interface (API). In some embodiments, data management service 110 provides data (or access to data such as via a link) in response to data requests. For example, the data requests can be communicated to data management service 110 by client system 140, or a data requesting service, such as a third-party service. Examples of the data requesting service include Tableau (e.g., an analytics software provided by Tableau Software, LLC), Microsoft Power BI, Apache Spark™ (e.g., an open-source unified analytics engine for large-scale data processing), Pandas (e.g., software library written for the Python programming language for data manipulation and analysis available at pandas.pydata.org), or various other data consuming clients.

According to various embodiments, data management service 110 manages (e.g., determines, stores, etc.) lineage data for one or more data entities stored in the one or more datasets stored in data store 120 or other data entities that are generated in connection with storing, reading, or otherwise manipulating data comprised in the one or more datasets. The lineage data includes an indication of one or more dependencies for a particular data entity relative to other data entities such as ancestor or descendant data entities. In some embodiments, data management service 110 stores the lineage data in a dataset comprised in data store 120. Data management service 110 can expose the lineage data for consumption by services or other systems such as client system 140 or a service running on control layer 114 or business application layer 116. For example, the lineage data is exposed to the client system 140 or other service via an API.

According to various embodiments, data management service 110 monitors changes to data entities, and uses the lineage data to determine data entities impacted by a change to a particular data entity. Examples of changes to a data entity include corruption of the data entity, an update to a data entity, a replacement of a data entity, etc. In response to detecting a change to a particular data entity, data management service 110 queries a dataset comprising lineage data for the lineage for the particular data entity. For example, data management service 110 uses an identifier associated with the changed data entity in connection with querying a dataset comprising the lineage data for an indication of data entities having dependencies with the changed data entity (e.g., data entities that depend directly, or indirectly, from the changed data entity).

In some embodiments, data management service 110 uses data layer 112 to determine lineage data for a data entity. Data layer 112 receives a query with respect to data stored in a dataset such as a dataset associated with the tenant or customer for which data layer 112 is deployed. In some embodiments, data layer 112 includes one or more clusters of compute resources such as virtual machines (e.g., cluster 115). As an example, cluster 115 includes one or more compute resources such as worker(s) 119 (e.g., worker nodes, etc.). Cluster 115 can use worker(s) 119 to process various jobs in connection with providing a service, such as processing jobs or queries with respect to one or more datasets. Data management service 110 (e.g., data layer 112) determines lineage data based on the jobs or queries, such as queries processed during execution of the jobs.

According to various embodiments, data layer 112 determines lineage data for one or more data entities based at least in part on a query. For example, data layer 112 determines the lineage data for a data entity based on a query tree corresponding to the query. In response to receiving a query (e.g., a query from an internal process such as a service/job running on worker(s) 119, a query from a user via client system 140, etc.), data layer 112 parses the query to determine the corresponding query tree. Data layer 112 can determine (e.g., generate) unique identifiers for each node within the query tree. In some embodiments, data layer 112 determines the query tree contemporaneous with receipt or execution of the query, such as in real-time upon receipt of the query. For example, data layer 112 detects a query among cluster 115 and extracts (e.g., using query tree extractor 117) the query tree from the query. In response to determining the query tree, data layer 112 determines the lineage data for a data entity based at least in part on the query tree. For example, data layer 112 determines lineage data for a data entity generated during execution of the query. As another example, data layer 112 determines lineage data for an upstream data entity from which a data entity generated during execution of the query tree depends (e.g., directly or indirectly such as a dependence from an intermediary data entity that itself depends on the upstream data entity, etc.).

In some embodiments, data layer 112 implements an instance of a data analytics service/package, such as Apache Spark™, and uses the query tree generated by the data analytics service/package to determine lineage data. For example, Apache Spark transforms a user query into a query tree called an Unresolved or Parsed Logical Plan. Data layer 112 can use the query tree to determine dependencies between/among the data entities.

In some embodiments, data layer 112 determines the lineage data based on the query tree by traversing the query tree. Data layer 112 can begin at a root node of the query tree and traverse the query tree to respective nodes or leaves in the query tree. Data layer 112 uses information obtained by traversing the query tree to determine dependencies between/among data entities. For example, data layer 112 uses the information obtained by traversing the query data to determine interdependencies among one or more of tables, views, columns, etc. As another example, in the case of a view being triggered by a dashboard, data layer 112 can capture a dashboard identifier for the dashboard that triggered the view and a view identifier for the view, data layer 112 can further store the dependency between the view identifier and the dashboard identifier.

In response to determining the lineage data, data layer 112 can provide to control layer 114 the lineage data and identifiers for data entities referenced in the lineage data. In response to receiving the lineage data from data layer 112, control layer 114 can store the lineage data in data store 120, such as in a dataset comprising a mapping of lineage data to data entities, or otherwise store the lineage data in association with the applicable data entities. In some embodiments, if a data entity has multiple dependencies (e.g., the data entity depends for a plurality of ancestor data entities), control layer 114 can store a single record reflecting the multiple dependencies. In some embodiments, control layer 114 stores multiple records for each of the multiple dependencies for the data entity.

In some embodiments, data management service 110 uses control layer 114 to respond to queries for lineage data with respect to a particular data entity. As an example, client system 140 uses an API to connect to data management service and request lineage data for a particular data entity (or set of data entities). Control layer 114 receives the request for lineage data (e.g., a lineage query) from the API, queries data store 120 for lineage data responsive to the query and provides the lineage data to the system or service requesting the lineage data. As an example, control layer 114 receives a lineage query for a particular data entity, obtains a lineage data identifier for query response lineage data corresponding to the particular data entity, where the lineage data identifier for the query response lineage data is obtained based on a mapping of entity identifiers to lineage identifiers, obtains the lineage data corresponding to the lineage data identifier, and provides the query response lineage data or an indication of the query response lineage data in response to the lineage query.

In some embodiments, control layer 114 enforces permissions with respect to data entities and in connection with providing data entities (or identifiers for the data entities). For example, in response to receiving a lineage query, control layer 114 determines whether the user, system, or other process (e.g., an automated job, such as a workflow) from which the lineage query is received, has permission to view the one or more data entities corresponding to the lineage requested by the lineage query. Control layer 114 can use a credential associated with the user, system, or process to determine whether such user, system, or process has the requisite permissions. In response to determining that the user, system, or other process has requisite permissions for the one or more data entities responsive to the lineage query, control layer 114 can expose such data entities in response to lineage query. If control layer 114 determines that the user, system, or process has permissions for only a subset of all data entities responsive to the lineage query, control layer 114 exposes only the subset of data entities for which the user, system, or process has requisite permissions. Control layer 114 can hide, or otherwise block access to, data entities that are responsive to the lineage query but for which the user, system, or process does not have adequate permissions. Control layer 114 can check the permissions for a user, system, or process by querying a mapping of credentials to permitted data entities, permitted groups of data entities, or permitted types of data entities, etc.

In some embodiments, data management service 110 (e.g., data layer 112 and/or control layer 114) monitors a state of data entities. Data management service 110 can detect if a data entity becomes corrupt, or if a data entity is updated or replaced with a new data entity. In response to detecting that a data entity becomes corrupt or is otherwise updated or replaced, data management service 110 can determine whether any data entities may be impacted by the corruption, updating, or replacement. For example, data management service 110 determines data entities having a dependency with respect to the particular data entity deemed to be corrupt, updated, or replaced. Data management service 110 may determine a set of one or more descendant data entities (e.g., downstream data entities) that depend directly or indirectly from the particular data entity deemed to be corrupt, updated, or replaced. In response to determining that one or more data entities are impacted by the particular data entity that becomes corrupt or is otherwise updated (e.g., further developed) or replaced, data management service 110 can cause a corrective action to be performed with respect to the one or more impacted data entities. For example, data management service 110 detects that a particular data entity is corrupted, causes the corruption of the particular data entity to be resolved (e.g., updated, or deleted and replaced with a new data entity), and determines whether any downstream data entities are impacted. In response to determining that downstream data entities are impacted, data management service 110 can cause a corrective action to be performed with such downstream data entities, such as cause the downstream data entities to be recomputed based on the updated or new data entity, or to otherwise correct a dependency between the downstream data entities and the updated or new data entity (e.g., the lineage data for the downstream data entities is updated to include a dependency to the updated or new data entity). Examples of corrective actions include: (i) providing a notice to a downstream data entity informing the user/system of the corruption or update to the upstream data entity, (ii) causing one or more downstream data entities to be recomputed based on the change to the upstream data entity, (iii) update dependencies of downstream data entities, etc. Various other corrective actions may be performed. For example, the lineage data for the one or more impacted downstream data entities is updated to include a dependency to a data entity corresponding to the identifier for the new/updated data entity.

According to various embodiments, system 100 comprises data store 120. System 100 uses data store 120 to store one or more datasets comprising data entities and lineage data for the data entities. Data store 120 can store datasets for a plurality of tenants or customers serviced by data management service 110.

According to various embodiments, system 100 comprises administrator system 130 for use by an administrator such as an administrator of data management service 110 or an administrator of a user associated with data store 120 and/or an instance of data management service 110. For example, administrator system 130 comprises a system for communication, data access, computation, etc. An administrator uses administrator system 130 to maintain a dataset stored in data store 120, to define and manage applications provided by system 100, to set data management policies, to provide various system configurations or settings, etc. For example, an administrator uses administrator system 130 to define one or more security policies that are to be enforced (e.g., by data management service 110, data layer 112, and/or control layer 114) with respect to a data stored at data store 120 (e.g., data entities, lineage data for data entities, etc.). In some embodiments, administrator system 130 communicates with data management service 110 via a web-interface (e.g., by using a web browser, etc.). For example, administrator system 130 communicates with data management service 110 via a web-browser installed on administrator system 130 (e.g., via a user interface configured by an application running on data management service 110). In some embodiments, administrator system 130 communicates with data management service 110 via an application or service running on administrator system 130 (e.g., a connector or API corresponding to data management service 110).

According to various embodiments, data management service 110 comprises business application layer 116. Data management service 110 uses business application layer 116 to provide an interface via which a user (e.g., using administrator system 130, client system 140, etc.) may interact with various applications such as a development application for developing a feature or model for analyzing the data stored in the data store 120, an application for querying a dataset stored in data store 120, an application for querying lineage data for one or more data entities stored in data store 120, an application to access files stored in a dataset (e.g., a dataset stored in data store 120), an application to perform dataset cleanup such as compaction operations, etc. Various other applications can be provided by business application layer 116. For example, a user queries data layer 112 by sending a query/request to business application layer 116, which interfaces with data layer 112 to obtain information responsive to the query (e.g., business application layer 116 formats the query according to the applicable syntax and send the formatted query to data layer 112). As another example, an administrator uses an interface provided/configured by business application layer 116 to configure (e.g., define) one or more security policies, including configuring access permissions to files, data entities, lineage data, and/or one or more data management policies.

According to various embodiments, system 100 comprises client system 140. Client system 140 is used by a user such as a user corresponding to a data recipient (e.g., a developer such as a developer of code, a developer of a model, a user of an organization associated with a one or more datasets stored at data store 120, etc.) to communicate with data management service 110 (e.g., a business application layer 116.) and/or data stored in data store 120. As an example, client system 140 communicates with data management service 110 via a web-interface. In some embodiments, client system 140 communicates with data management service 110 via an application or service running on client system 140 (e.g., a module such as a connector or API that interfaces with data management service 110). In some embodiments, a user uses client system 140 to develop code on a business application layer, which makes a call to with respect to data exposed via data management service 110, or to invoke a task to be performed with respect to certain data stored in data store 120 (e.g., to update a data entity, to recompute a data entity, etc.), to modify code for a business application (e.g., to execute code against data stored in data store 120), to query data store 120 or a data share corresponding to a subset of data (e.g., data objects) within data store 120 (e.g., in connection with discovering code, a library, a module, etc.), etc.

According to various embodiments, system 100 comprises data source 150. Data source 150 can provide data to be processed by data management service 110 and stored in datasets on data store 120. For example, data management service 110 can ingest data provided by data source 150.

Figure 2:
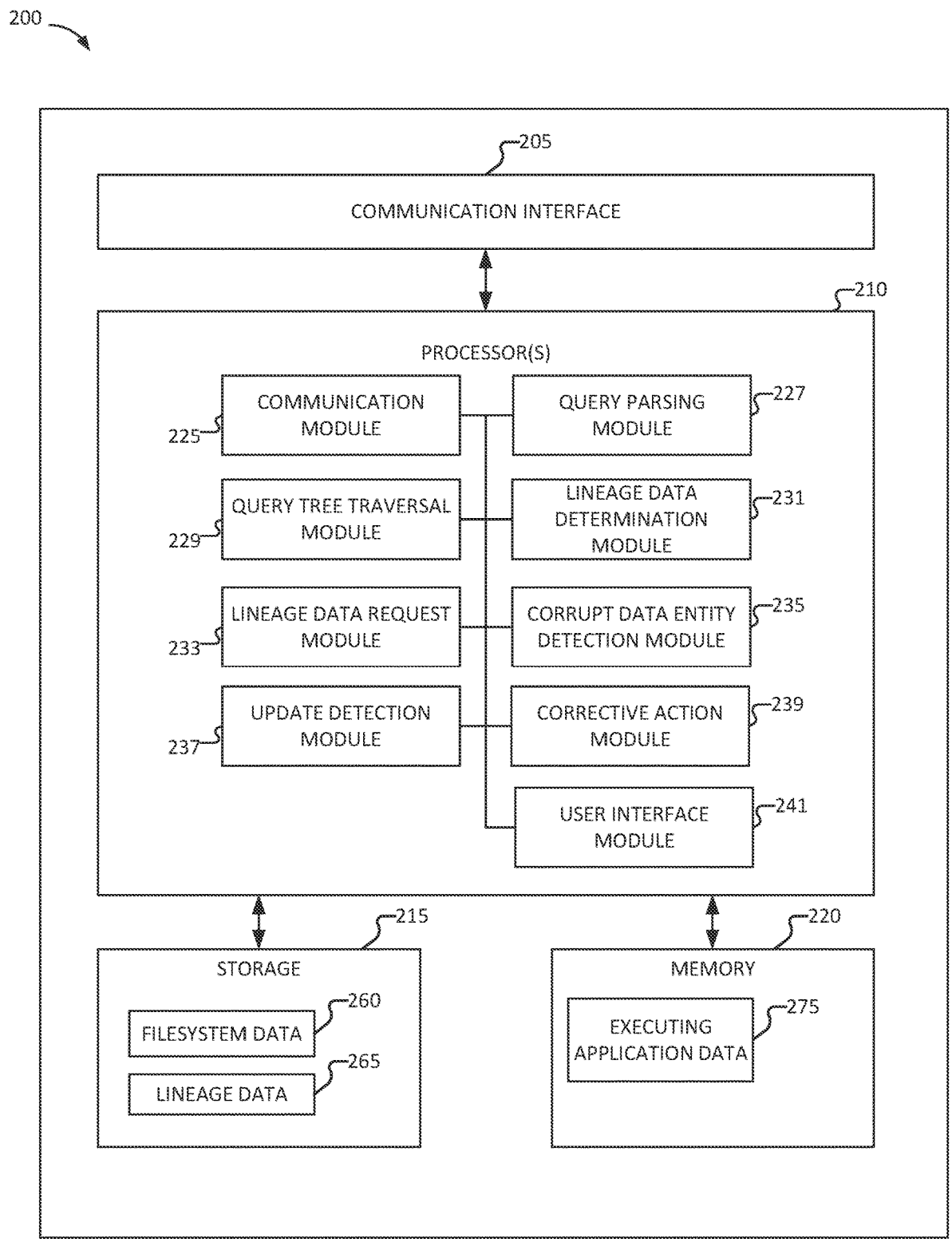
FIG. 2 is a block diagram of a data management service according to various embodiments of the present application.

FIG. 2 is a block diagram of a data management service according to various embodiments of the present application. According to various embodiments, system 200 implements at least part of system 100 of FIG. 1 (e.g., data management service 110), process 400 of FIG. 4, process 500 of FIG. 5, process 600 of FIG. 6, process 700 of FIG. 7, process 800 of FIG. 8, process 900 of FIG. 9A, and/or process 950 of FIG. 9B.

In the example shown, system 200 implements one or more modules in connection with managing data, determining lineage data for data entities, mediating access by data recipients with respect to the data entities or lineage data, and/or to cause a corrective action to be performed in response to a data entity being corrupted, updated, deleted, replaced, etc. System 200 comprises communication interface 205, one or more processors 210, storage 215, and/or memory 220. One or more processors 210 comprises, or implements, one or more of communication module 225, query parsing module 227, query tree traversal module 229, lineage data determination module 231, lineage data request module 233, corrupt data entity detection module 235, update detection module 237, corrective action module 239, and/or user interface module 241.

In some embodiments, system 200 comprises communication module 225. System 200 uses communication module 225 to communicate with various other systems such as a user system, an administrator system, and/or a data store (e.g., a distributed data storage system). For example, communication module 225 provides to communication interface 205 information that is to be communicated. As another example, communication interface 205 provides to communication module 225 information received by system 200. Communication module 225 is configured to receive user input to a user system such as a data access request, a request to configure a data management service, a data management policy, a security policy, an access policy, a storage system configuration such as a configuration for a partitioning of data, a query for lineage data, a selection of a corrective action, etc. The user input to the user system can include the creation of a new file, a modification or update to a file, a query for a file (e.g., a csv file, a library, a module, etc.), a query for a data entity, a query for lineage data for a data entity, a request to set one or more security policies (e.g., a permission with respect to accessing a file or a directory), a request to set one or more data management policies, a request to set one or more data access permissions, etc. Communication module 225 is configured to provide various user systems or data requesting services with information such as a user interface (e.g., an interface corresponding to a workspace or notebook), information that is responsive to one or more queries or tasks requested to be executed, locations at which data is to be accessed, credentials for accessing data, URLs corresponding to locations at which data responsive to data access requests can be retrieved, etc. In some embodiments, communication module 225 communicates data responsive to data requests (e.g., queries to a dataset that has been clustered into a set of files, etc.).

In some embodiments, system 200 comprises query parsing module 227. System 200 uses query parsing module 227 to obtain a query and to parse the query. Query parsing module 227 can obtain the query based on a user input (e.g., a user query) or in connection with system 200 processing (e.g., executing) a job, such as a job to be invoked by a process running on system 200. Query parsing module 227 can parse the query contemporaneously with receipt of the query by system 200. For example, the query is parsed in real-time upon receipt of the query. Parsing the query can include deconstructing the query to determine one or more interrelationships of data entities, operations, etc. invoked in connection with determining a response to the query. Query parsing module 227 can obtain a query tree based on the parsing of the query. Each node within the query tree can be assigned a unique node identifier.

In some embodiments, system 200 comprises query tree traversal module 229. System 200 uses query tree traversal module 229 to obtain the query tree (e.g., from query parsing module 227 or otherwise based on the parsing of the query) and to walk the query tree to discover the various data entities invoked (e.g., called, generated, referenced, etc.). For example, query tree traversal module 229 traverses the query tree to determine a set of paths from a root node to various nodes or leaves within the query tree. Each path may correspond to a different lineage between/among corresponding data entities.

In some embodiments, system 200 comprises lineage data determination module 231. System 200 uses lineage data determination module 231 to determine lineage data for one or more data entities invoked in the data tree. Lineage data determination module 231 can determine the lineage data contemporaneous with execution of the corresponding query. Lineage data determination module 231 determines interdependencies between/among data entities in the query tree, such as interdependencies of data entities along a path of the query tree traversed by query tree traversal module 229. In response to determining the lineage data, query tree traversal module 229 stores the lineage data in association with the data entity (or data entities, for example, an upstream data entity and the downstream data entity). For example, lineage data determination module 231 determines an ancestor data entity for a particular data entity and stores the lineage (e.g., the association) between the particular data entity and the ancestor data entity. The association between data entities can be stored in a mapping of upstream data entities to downstream data entities and/or a mapping of downstream data entities to upstream data entities, etc.

Lineage data determination module 231 can lineage data in association with one or more identifiers to facilitate querying a dataset comprising the lineage data. Examples of the identifiers include: (i) an identifier of an upstream data entity, (i) an identifier of a downstream entity, (iii) an identifier of a node in the query tree with which the data entity is associated or at which the data entity was generated, (iv) an identifier of the linage, etc.

In some embodiments, system 200 comprises lineage data request module 233. System 200 uses lineage data request module 233 to process queries for lineage data. Queries for lineage data may be sent from a user on a client system, a process running on system 200 (e.g., execution of a job), or other service that uses data entities stored by system 200. Queries for lineage data include an identifier with which responsive lineage data can be obtained (e.g., determined). For example, the query for lineage data can include an identifier for a data entity for which a user desires the lineage data (e.g., to identify upstream or downstream data entities, etc.). In response to user receiving the query for lineage data, lineage data request module 233 uses the identifier comprised in the query to perform a lookup with respect to a dataset storing lineage data. For example, in the case where a user has requested lineage data for a particular data entity and the query sent by the user includes a data entity identifier, lineage data request module 233 obtains the data entity identifier from the query and then looks up lineage data associated with the data identifier stored in the dataset.

In some embodiments, system 200 comprises corrupt data entity detection module 235. System 200 uses corrupt data entity detection module 235 to monitor data entities and/or to detect whether a data entity has been corrupted. Corrupt data entity detection module 235 can detect that a data entity has been corrupted in response to a determination that a job has failed. In response to determining that a job has failed, corrupt data entity detection module 235 determines the applicable lineage data for one or more entities invoked by the job and uses the lineage data to diagnose the failure. As an example, corrupt data entity detection module 235 determines that an invocation of a particular data entity (e.g., a computation of the data entity, etc.) fails, detects one or more data entities from which the particular data entity directly or indirectly depends (e.g., an upstream or ancestor data entity), and can determine whether any of the one or more data entities from which the particular data entity depends has been corrupted. As another example, corrupt data entity detection module 235 performs a periodic diagnostic check (e.g., at a predefined time interval, which may be configurable) with respect to data entities stored in a dataset to determine whether any data entity has been corrupted. If corrupt data entity detection module 235 detects that a data entity has been corrupted, corrupt data entity detection module 235 can use lineage data to determine one or more data entities that may be impacted by such corruption, such as data entities that directly or indirectly depend on the data entity that has been corrupted. In response to detecting that a data entity has been corrupted, corrupt data entity detection module 235 can provide to corrective action module 239 an indication of such corruption or of the one or more data entities impacted by the corruption.

In some embodiments, system 200 comprises update detection module 237. System 200 uses update detection module 237 to monitor data entities within a dataset and/or to determine whether a data entity has been updated. Update detection module 237 can run a process that detects when a data entity is modified (e.g., further developed by a developer via a client system) or replaced with a new data entity, etc. In response to determining that a data entity has been modified, update detection module 237 determines one or more data entities that are impacted by the update, if any. For example, update detection module 237 determines one or more data entities that directly or indirectly depend on the updated data entity. In response to determining that one or more data entities are impacted by the update, update detection module 237 can provide to corrective action module 239 an indication of such update or of the one or more data entities impacted by the update.

In some embodiments, system 200 comprises corrective action module 239. System 200 uses corrective action module 239 to determine that a corrective action is to be performed, determine the corrective action(s) to be performed and/or to cause the corrective action(s) to be performed. Corrective action module 239 can determine that a corrective action is to be performed in response to determining (e.g., receiving an indication) that a data entity is corrupted, updated, replaced, etc. and/or that one or more data entities are impacted by such corruption, update, replacement, etc. Examples of corrective actions include replacing the impacted data entity, recomputing (or causing re-computation of) the impacted data entity, providing an indication to a user (e.g., an administrator), etc. In response to determining that a corrective action is to be performed, corrective action module 239 can cause the corrective action to be performed, such as by directly performing the corrective action, or to request another process or system to perform the corrective action.

In some embodiments, corrective action module 239 determines whether a user or process has permissions to access (e.g., view, modify, etc.) a data entity. For example, corrective action module 239 queries a mapping of permissions of data entities to users (e.g., user identifiers, groups of users, etc.) to determine whether a user or process has permission to view a particular data entity. Corrective action module 239 can use a credential associated with the user or process, which is included in a request for lineage data or associated with a job being performed, to determine whether the user or process has permission to access the data entity (e.g., a data entity impacted by a corruption, replacement, etc. of another data entity, a data entity in a lineage for another data entity). In response to determining that a user or process does not have requisite permission to access a data entity, corrective action module 239 can restrict access to the data entity, such as hiding the data entity when providing the lineage data, etc.

In some embodiments, system 200 comprises user interface module 241. System 200 uses user interface module 241 to provide a user interface to a user (e.g., via a client system, etc.) via which the user configures, defines, develops data entities, data recipients to be provided access to such data entities, access permissions with respect to the data recipients and/or data entities, etc.

According to various embodiments, storage 215 comprises one or more of filesystem data 260 and/or lineage data 265. Storage 215 may further comprise a shared storage (e.g., a network storage system), database data, and/or user activity data.

In some embodiments, filesystem data 260 comprises a database such as one or more datasets for data entities (e.g., one or more datasets for one or more features, models, schemas, tables, etc.).

In some embodiments, lineage data 265 comprises information pertaining to lineage of one or more data entities. For example, lineage data 265 comprises a mapping of upstream data entities to downstream entities, etc. Lineage data 265 provides an indication of dependencies between/among various data entities. In some embodiments, lineage data comprises the following:

```
message Lineage {
enum TableType {
TABLE=0;
PERSISTED_VIEW=1;
TEMP_VIEW=2;
}
enum ErrorType {
UNSUPPORTED_OPERATOR=0;
UNSUPPORTED_OPERATOR_COLUMN=1;
}
message Table {
optional plans.WrappedString name=1;
optional TableType table_type=2;
optional plans.WrappedString location=3;
optional plans.WrappedString table_id=4;
}
message Column {
optional plans.WrappedString name=1;
optional Table table=2;
}
message ColumnLineageEntry {
optional plans.WrappedString name=1;
repeated Column columns=2;
}
message Error {
optional ErrorType error_type=1;
optional plans.WrappedString message=2;
}
optional Table target=1;
repeated Table sources=2;
repeated ColumnLineageEntry columns=3;
repeated Error errors=4;
}
message CommandLineage {
optional Lineage.Table table=1;
optional plans.WrappedString command=2;
repeated Lineage lineages=3;
}
message ReadLineage {
optional plans.WrappedString root_operator=1;
repeated Lineage lineages=2;
}
Footer
```

According to various embodiments, memory 220 comprises executing application data 275. Executing application data 275 comprises data obtained or used in connection with executing an application such as an application executing in connection with managing data entities, an application executing to process jobs, an application that processes and/or responds to queries, an application for providing lineage data in response to requests for such lineage data, an application that enforces security of data in the storage system, an application that executes code being developed in a workspace, etc. In various embodiments, the application comprises one or more applications that perform one or more of receiving and/or executing a query or command, generating a report and/or configuring information that is responsive to an executed query or command, and/or providing to a user information that is responsive to a query or command. Other applications comprise any other appropriate applications (e.g., an index maintenance application, a communications application, a chat application, a web browser application, a document preparation application, a report preparation application, a user interface application, a data analysis application, an anomaly detection application, a user authentication application, a security policy enforcement application, a code analysis application, a code development application, etc.).

Figure 3A:
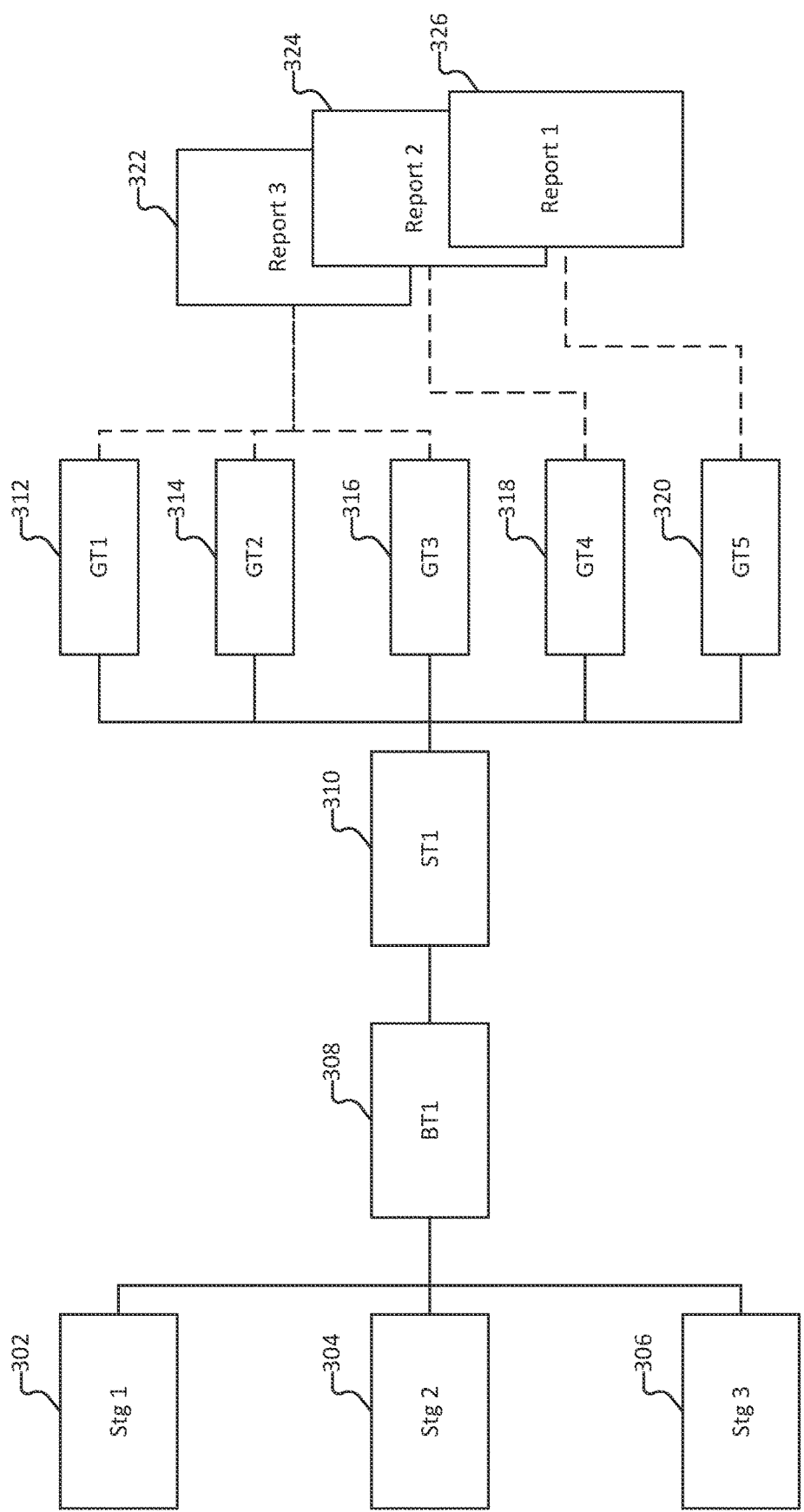
FIG. 3A is an illustration of lineage data for one or more data entities according to various embodiments of the present application.

FIG. 3A is an illustration of lineage data for one or more data entities according to various embodiments of the present application. In some embodiments, lineage 300 is implemented by system 100 of FIG. 1 and/or system 200 of FIG. 2.

As illustrated in FIG. 3A, lineage 300 comprises a plurality of data entities and relationships/interdependencies between (or among) the various data entities. Examples of the data entities include tables 302-320 and reports 322, 324, and 326. Tables 302-320 include various tables that are different inputs to reports 322, 324, and 326, or correspond to different stages of data processing. For example, tables 302-306 can correspond to tables in a staging step (e.g., data ingested and processed in connection executing a query for which report 322, 324, and/or 326 are generated).

Data included in tables 302-306 can be processed through a series of zones (or levels of a tree structure when the lineage is represented as a tree) corresponding to varying levels of processing or different types of processing. In the example illustrated in FIG. 3A, the series of zones are referred to as a bronze zone, a silver zone, and a gold zone. Bronze zone includes table 308, silver zone includes 310, and gold zone includes tables 312-320.

According to various embodiments, the system traverses the lineage to determine lineage data with respect to various data entities within the lineage. In various embodiments, the descriptions below for lineage apply to cell(s), row(s), column(s), or sub area(s) of the table(s) as opposed to entire table(s), or any other appropriate data entities.

In connection with traversing the lineage, the system determines that tables 302-306 are upstream in relation to table 308, table 310, tables 312-320, and reports 322-326. For example, table 308 directly depends on tables 302-306. As another example, table 310, tables 312-320, and reports 322-326 depend indirectly on tables 302-306. The lineage data for tables 302-306 respectively indicate that tables 308-320 and reports 322-326 are respectively downstream data entities. In addition, the lineage data may indicate an extent to which the downstream data entities directly descend from a particular data entity. For example, the lineage data for tables 302-306 indicate that table 308 is a direct descendant (e.g., directly downstream), and tables 310-320 and reports 322-326 are indirect descendants. As another example, the lineage for tables 302-306 indicate that table 310 is a grandchild (e.g., a second order descendant), tables 312-320 are great-grandchildren (e.g., a third order descendant), and reports 322-326 are great-great-grandchildren (e.g., fourth order descendant).

In the example illustrated in FIG. 3A, lineage data for table 308 indicates that tables 302-306 correspond to upstream data entities, and tables 310-320 and reports 322-326 correspond to downstream data entities. The lineage data may indicate an extent to which 310-320 and reports 322-326 are downstream from table 308, such as an indication that table 310 directly descends (e.g., a first order descendant) from table 308, tables 312-314 are grandchildren (e.g., a second order descendant), and reports 322-326 are great-grandchildren (e.g., third order descendant).

In the example illustrated in FIG. 3A, lineage data for table 310 indicates that tables 302-308 correspond to upstream data entities, and tables 312-320 and reports 322-326 correspond to downstream data entities. The lineage data may indicate an extent to which 312-320 and reports 322-326 are downstream from table 308, such as an indication that tables 312-320 directly descend (e.g., a first order descendant) from table 310, and reports 322-326 are grandchildren (e.g., a second order descendant).

In the example illustrated in FIG. 3A, lineage data for tables 312-320 respectively indicate that tables 302-310 correspond to upstream data entities and reports 322-326 correspond to downstream data entities. The lineage data may indicate an extent to which reports 322-326 are downstream from tables 312-320, such as an indication that reports 322-326 directly descend (e.g., a first order descendant) from tables 312-320. The lineage data may indicate an extent to which tables 312-320 descends from tables 302-310, such as an indication that tables 312-320 are respectively children from table 310 (e.g., tables 312-320 directly descend from table 310), tables 312-320 are respectively grandchildren from table 308 (e.g., tables 312-320 are second order descendants of table 308), and tables 312-320 are respectively great-grandchildren from tables 302-306 (e.g., tables 312-320 are third order descendants of tables 302-306).

In the example illustrated in FIG. 3A, lineage data for reports 322-326 respectively indicate that tables 302-320 correspond to upstream data entities and reports 322-326 correspond to downstream data entities. The lineage data may indicate an extent to which reports 322-326 are downstream from tables 312-320, such as an indication that reports 322-326 directly descend (e.g., a first order descendant) from tables 312-320. The lineage data may indicate an extent to which tables 312-320 descends from tables 302-310, such as an indication that tables 312-320 are respectively children from table 310 (e.g., tables 312-320 directly descend from table 310), tables 312-320 are respectively grandchildren from table 308 (e.g., tables 312-320 are second order descendants of table 308), and tables 312-320 are respectively great-grandchildren from tables 302-306 (e.g., tables 312-320 are third order descendants of tables 302-306).

In some embodiments, the lineage data for a particular data entity indicates data entities on which the particular data entity directly depends/descends, and data entities that directly descend from/depend on the particular data entity. The system can stitch together (e.g., aggregate) the lineage data to determine indirect dependence among data entities. As an example, with respect to lineage 300 of FIG. 3A, the lineage data for table 310 indicates that table 308 is an upstream data entity and that tables 312-320 are downstream data entities. The system can refer to the lineage for table 308 to determine that tables 302-306 are further upstream (e.g., that table 310 indirectly depends on tables 302-306), etc.

In some embodiments, the lineage data indicates a relationship between upstream and downstream entities. For example, the lineage data for reports 322-326 can indicate relationships for particular fields or dashboards comprised in reports 322-326 (e.g., a first field of report 322 may depend on table 312, a second field of report 322 may depend on table 314, a third field of report may depend from table 316, etc.).

Figure 3B:
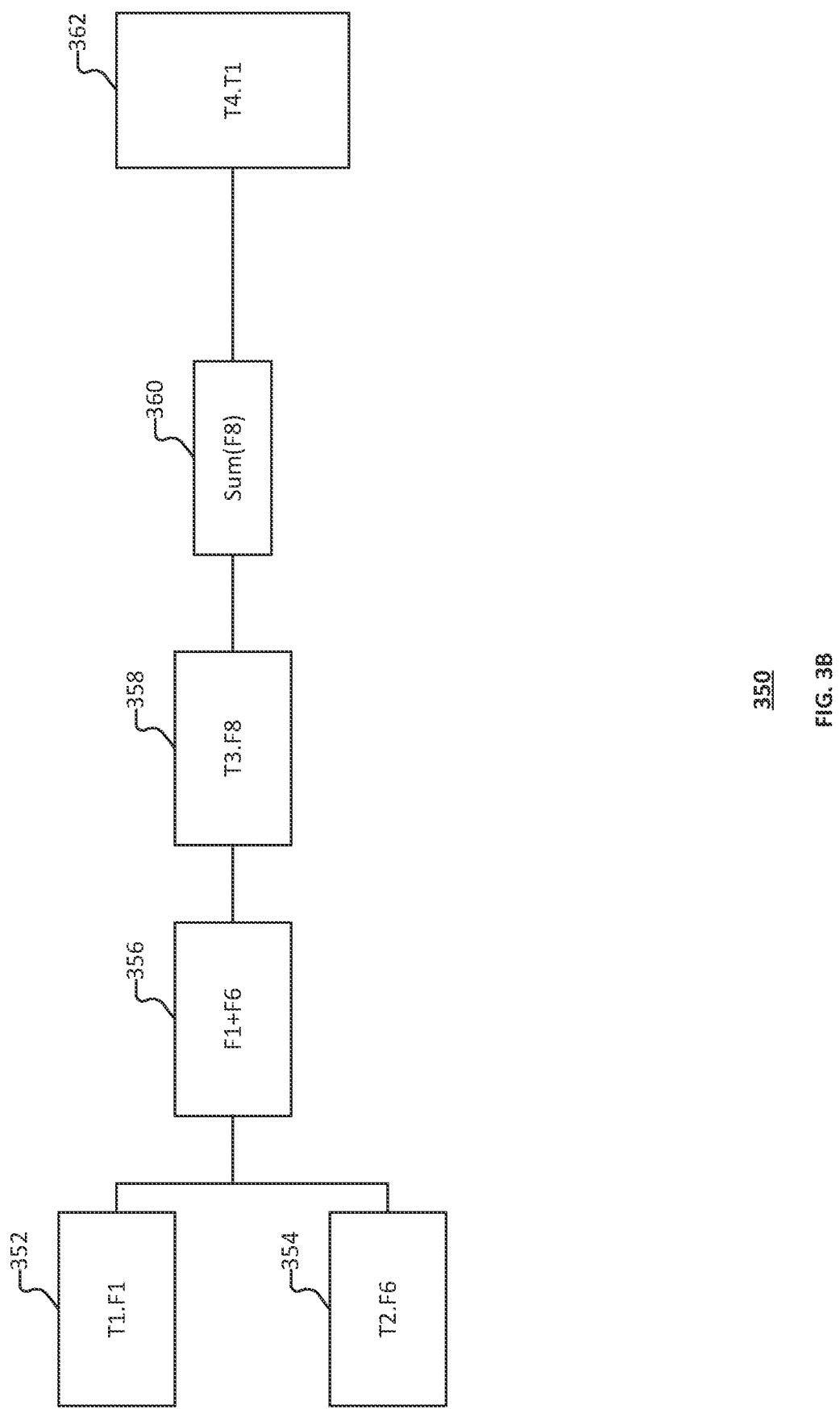
FIG. 3B is an illustration of lineage data for one or more data entities according to various embodiments of the present application.

FIG. 3B is an illustration of lineage data for one or more data entities according to various embodiments of the present application. In some embodiments, lineage 350 is implemented by system 100 of FIG. 1 and/or system 200 of FIG. 2.

In the example illustrated in FIG. 3B, lineage 350 includes field-level lineage data. For example, field 358 corresponds to field 8 of table 3. Field 358 is populated with the query: select T1.F1+T2.F6. For example, field 358 depends on table T1 and table T2, and specifically field F1 of table T1 (e.g., field 352) and field F6 of table T2 (e.g., field 354). As another example, table 362 is populated with the command select sum (T3.F8) from T3 group by T3.F9. Accordingly, table 362 depends on (e.g., descends from) summation 360, and indirectly descends from field 358.

According to various embodiments, the system uses the lineage data to determine dependency relationships, such as determining a list of data entities/objects used to populate a particular data entity. The lineage data can be used by developers in connection with documenting their environments and to manage/monitor impact of changes made to a particular data entity.

Figure 4:
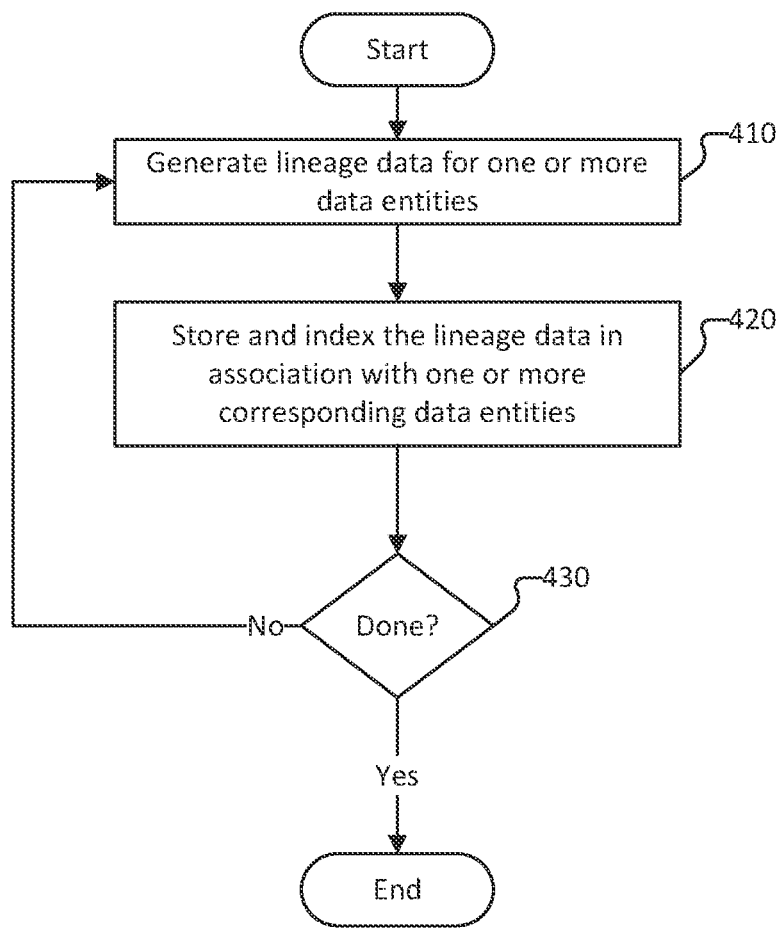
FIG. 4 is a flow diagram of a method for indexing lineage data for a data entity according to various embodiments of the present application.

FIG. 4 is a flow diagram of a method for indexing lineage data for a data entity according to various embodiments of the present application. Process 400 is implemented at least in part by system 100 of FIG. 1 and/or system 200 of FIG. 2.

At 410, lineage data for one or more data entities is generated.

At 420, the lineage data is stored and indexed in association with the one or more corresponding data entities.

At 430, a determination is made as to whether process 400 is complete. In various embodiments, process 400 is determined to be complete in response to a determination that no further lineage data is to be determined or provided, no further queries are to be analyzed/parsed, a user has exited the system, an administrator indicates that process 400 is to be paused or stopped, or any other appropriate determination of completeness. In response to a determination that process 400 is complete, process 400 ends. In response to a determination that process 400 is not complete, process 400 returns to 410.

Figure 5:
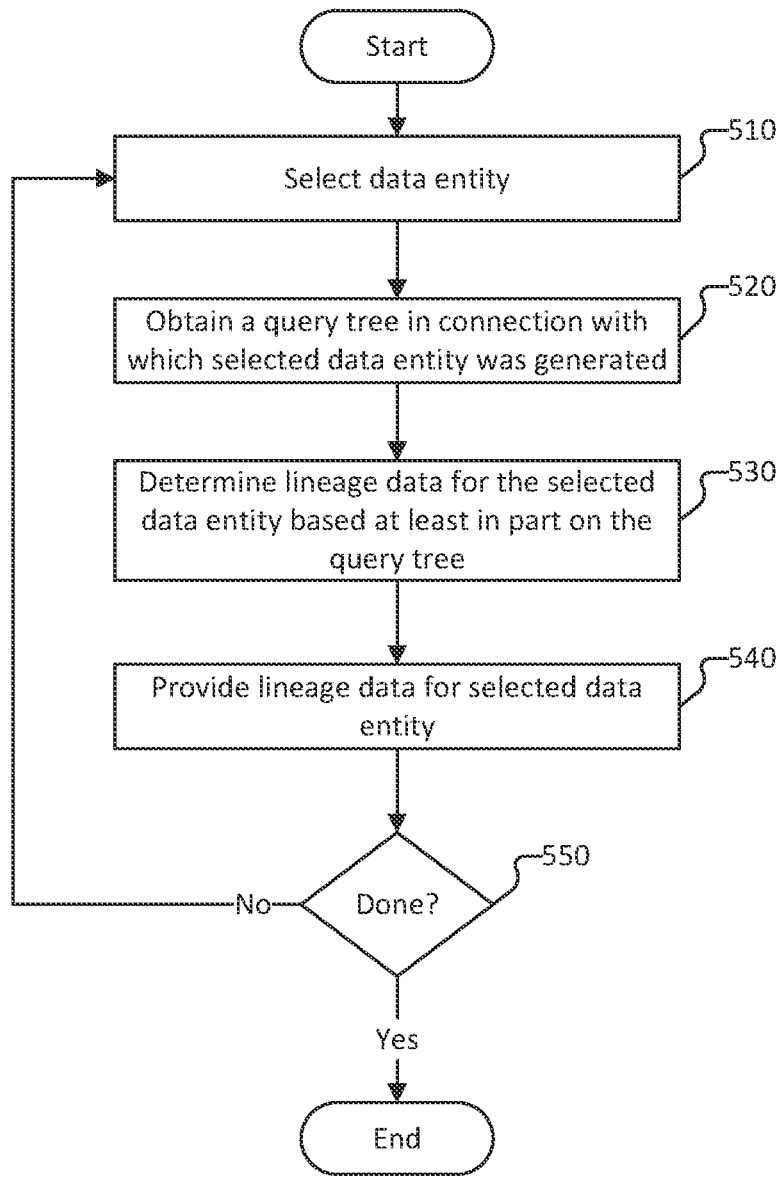
FIG. 5 is a flow diagram of a method for determining lineage data for a data entity according to various embodiments of the present application.

FIG. 5 is a flow diagram of a method for determining lineage data for a data entity according to various embodiments of the present application. Process 500 is implemented at least in part by system 100 of FIG. 1 and/or system 200 of FIG. 2. In some embodiments, process 500 is invoked by 410 of process 400 of FIG. 4.

At 510, a data entity is selected.

At 520, a query tree is obtained, wherein the query tree is associated with a query with which the selected data entity was generated. In some embodiments, the query tree can be obtained based on parsing the query.

At 530, lineage data for the selected data entity is determined based at least in part on the query tree.

At 540, lineage data is provided for the selected data entity. In some embodiments, the lineage data is provided to the system or process that invoked process 500. For example, the system can provide the lineage data to process 400 as a response to process 500 being invoked.

At 550, a determination is made as to whether process 500 is complete. In various embodiments, process 500 is determined to be complete in response to a determination that no further lineage data is to be determined or provided, no further queries are to be analyzed/parsed, a user has exited the system, an administrator indicates that process 500 is to be paused or stopped, or any other appropriate determination of completeness. In response to a determination that process 500 is complete, process 500 ends. In response to a determination that process 500 is not complete, process 500 returns to 510.

Figure 6:
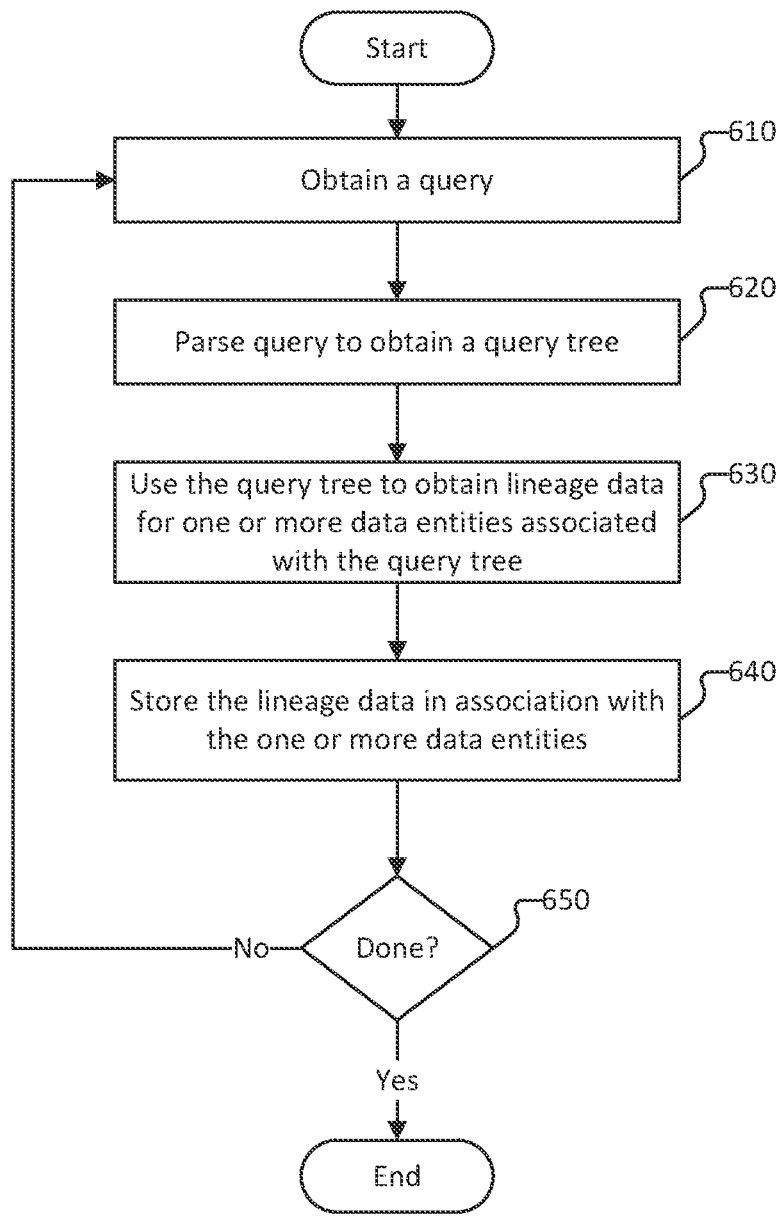
FIG. 6 is a flow diagram of a method for determining lineage data for a data entity according to various embodiments of the present application.

FIG. 6 is a flow diagram of a method for determining lineage data for a data entity according to various embodiments of the present application. Process 600 is implemented at least in part by system 100 of FIG. 1 and/or system 200 of FIG. 2. In some embodiments, process 500 is invoked by 410 of process 400 of FIG. 4.

At 610, a query is obtained.

At 620, a query is parsed to obtain a query tree.

At 630, the query tree is used to obtain lineage data for one or more data entities associated with the query tree.

At 640, the lineage data is stored in association with the one or more entities.

At 650, a determination is made as to whether process 600 is complete. In various embodiments, process 600 is determined to be complete in response to a determination that no further queries are received, no further queries are to be analyzed/parsed, a user has exited the system, an administrator indicates that process 600 is to be paused or stopped, or any other appropriate determination of completeness. In response to a determination that process 600 is complete, process 600 ends. In response to a determination that process 600 is not complete, process 600 returns to 610.

Figure 7:
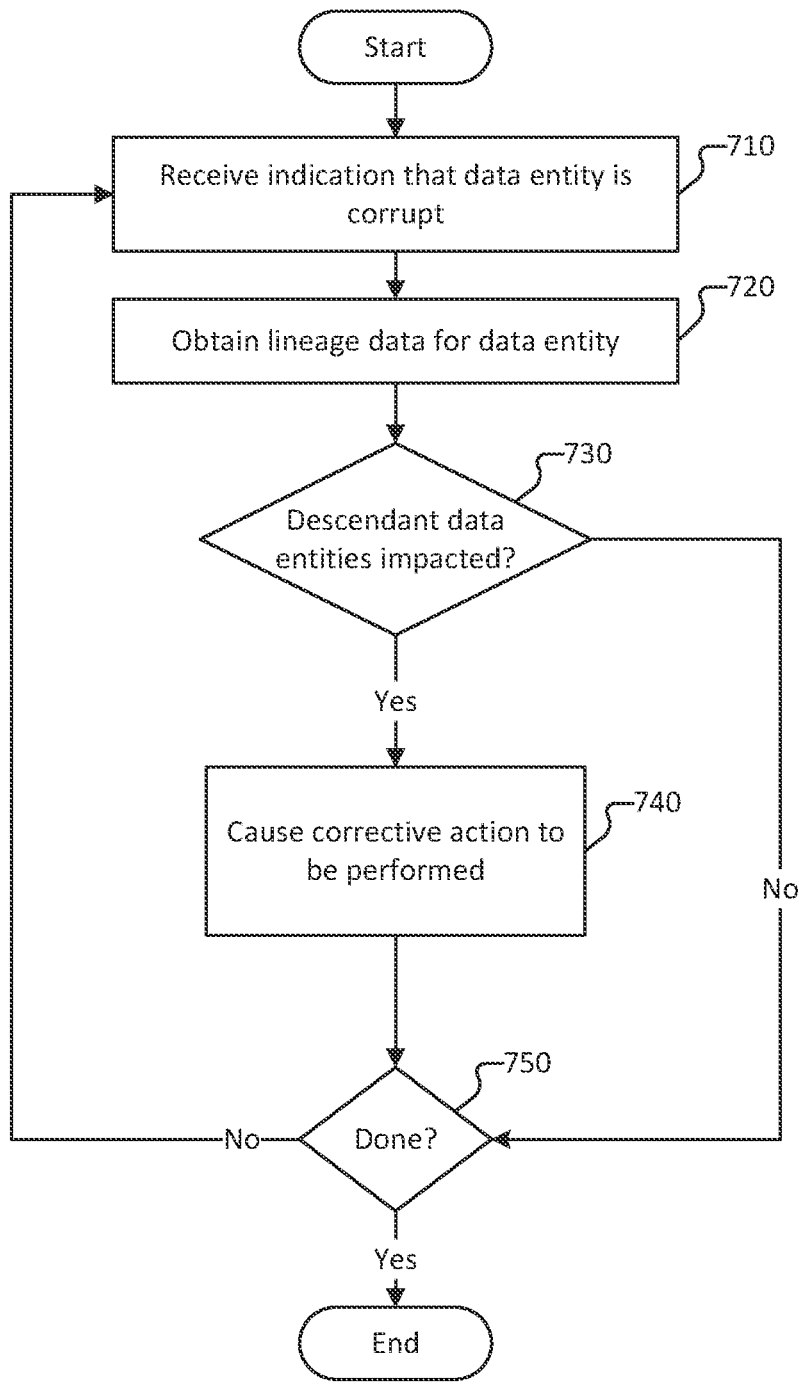
FIG. 7 is a flow diagram of a method for using lineage data for performing corrective actions with respect to a data entity according to various embodiments of the present application.

FIG. 7 is a flow diagram of a method for using lineage data for performing corrective actions with respect to a data entity according to various embodiments of the present application. Process 700 is implemented at least in part by system 100 of FIG. 1 and/or system 200 of FIG. 2.

At 710, an indication is received that a data entity is corrupt.

At 720, lineage data for the corrupted data entity is obtained. For example, the system obtains the lineage data for the corrupted data entity, such as in connection with determining data entities that are impacted by the corruption or in connection with performing a diagnostic of a cause of corruption.

At 730, a determination is made as to whether one or more descendant data entities are impacted by corruption of the corrupted data entity. In some embodiments, the system determines one or more data entities that are descendants of the corrupted data entity (e.g., data entities downstream from the corrupted data entity). The system can further determine whether the one or more descendant data entities are impacted by corruption of the corrupted data entity (or an update to, or replacement of, the corrupted data entity to resolve the corruption).

In some embodiments, the system deems one or more data entities that are downstream from the corrupted data entity (e.g., that descend directly or indirectly from the corrupted data entity) as being impacted by corruption of the data entity or the update to, or replacement of, the corrupted data entity to resolve the corruption.

In response to determining that the one or more descendant data entities are impacted by corruption of the corrupted data entity at 730, process 700 proceeds to 740 at which a corrective action is caused to be performed, and control passes to 750. For example, the system can update or replace the corrupted data entity. In some embodiments, in response to updating or replacing the corrupted data entity, the system causes a corrective action to be performed with respect the one or more descendant data entities deemed to be impacted by corruption of the corrupted data entity. For example, the system causes a data entity impacted by such corruption to be re-computed, such as based on an updated data entity or new data entity that replaces the corrupted data entity.

In response to determining that the one or more descendant data entities are not impacted by corruption of the corrupted data entity at 730, process 700 proceeds to 750.

At 750, a determination is made as to whether process 700 is complete. In various embodiments, process 700 is determined to be complete in response to a determination that no further data entities are deemed corrupt, a user has exited the system, an administrator indicates that process 700 is to be paused or stopped, or any other appropriate determination of completeness. In response to a determination that process 700 is complete, process 700 ends. In response to a determination that process 700 is not complete, process 700 returns to 710.

Figure 8:
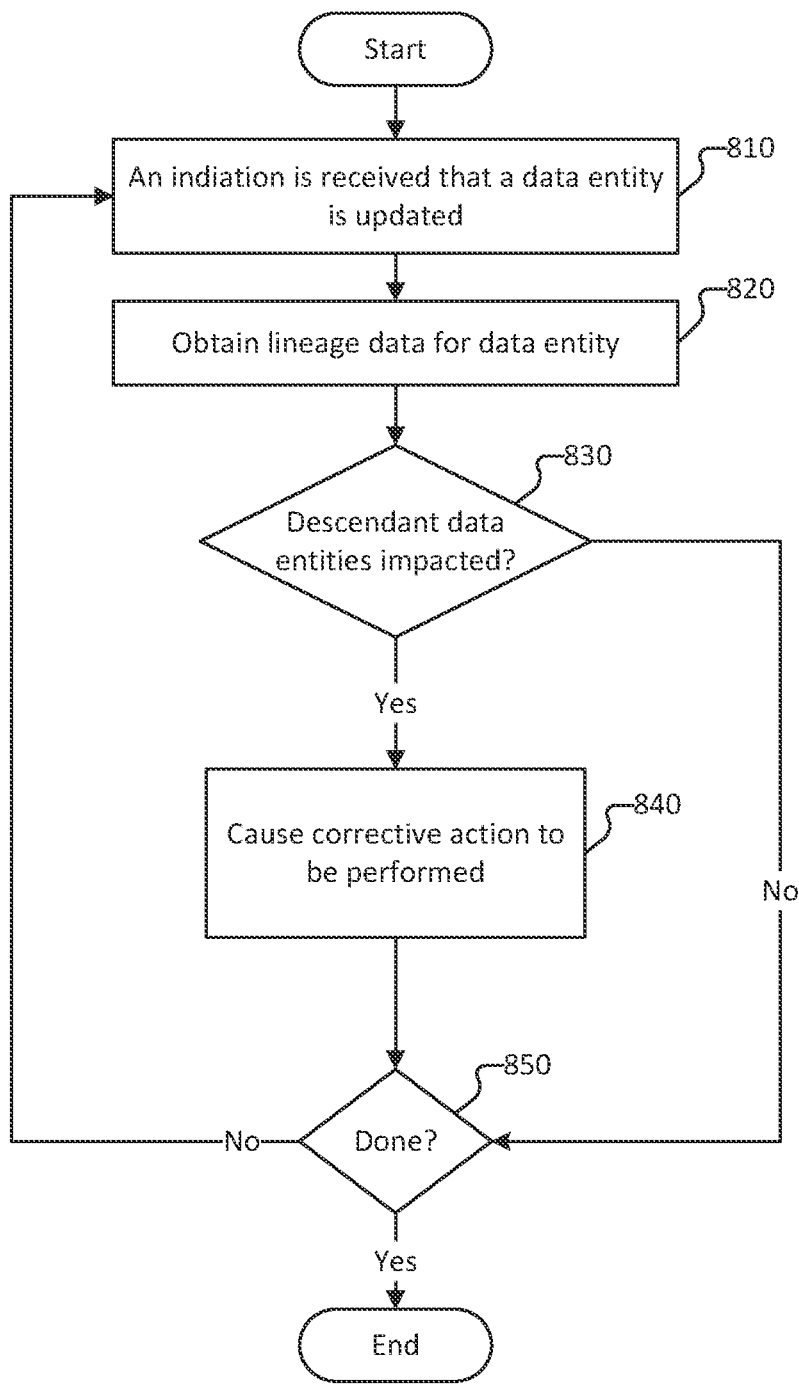
FIG. 8 is a flow diagram of a method for using lineage data for performing corrective actions with respect to a data entity according to various embodiments of the present application.

FIG. 8 is a flow diagram of a method for using lineage data for performing corrective actions with respect to a data entity according to various embodiments of the present application. Process 800 is implemented at least in part by system 100 of FIG. 1 and/or system 200 of FIG. 2.

At 810, an indication is received that a data entity is updated. For example, an indication is received that a corrupted data entity has been updated.

At 820, lineage data for the updated data entity is obtained.

At 830, a determination is made as to whether one or more descendant data entities are impacted by the updating of an updated corrupted data entity. In some embodiments, the system determines one or more data entities that are descendants of the data entity that was updated (e.g., data entities downstream from the data entity that was updated). The system can further determine whether the one or more descendant data entities are impacted by the updating or replacing of the data entity In some embodiments, the system deems one or more data entities that are downstream from the data entity that was updated (e.g., that descend directly or indirectly from the data entity that was updated/replaced) as being impacted by updating of the data entity.

In response to determining that the one or more descendant data entities are impacted by updating of the data entity at 830, process 800 proceeds to 840 at which a corrective action is caused to be performed. In some embodiments, in response to a data entity being updated or replaced, the system causes a corrective action to be performed with respect to the one or more descendant data entities deemed to be impacted by such update or replacement. For example, the system causes a data entity impacted by such update or replacement to be re-computed, such as based on an updated data entity or new data entity that replaces the data entity.

In response to determining that the one or more descendant data entities are not impacted by corruption of the corrupted data entity at 830, process 800 proceeds to 850.

At 850, a determination is made as to whether process 800 is complete. In various embodiments, process 800 is determined to be complete in response to a determination that no further data entities are updated, a user has exited the system, an administrator indicates that process 800 is to be paused or stopped, or any other appropriate determination of completeness. In response to a determination that process 800 is complete, process 800 ends. In response to a determination that process 800 is not complete, process 800 returns to 810.

Figure 9A:
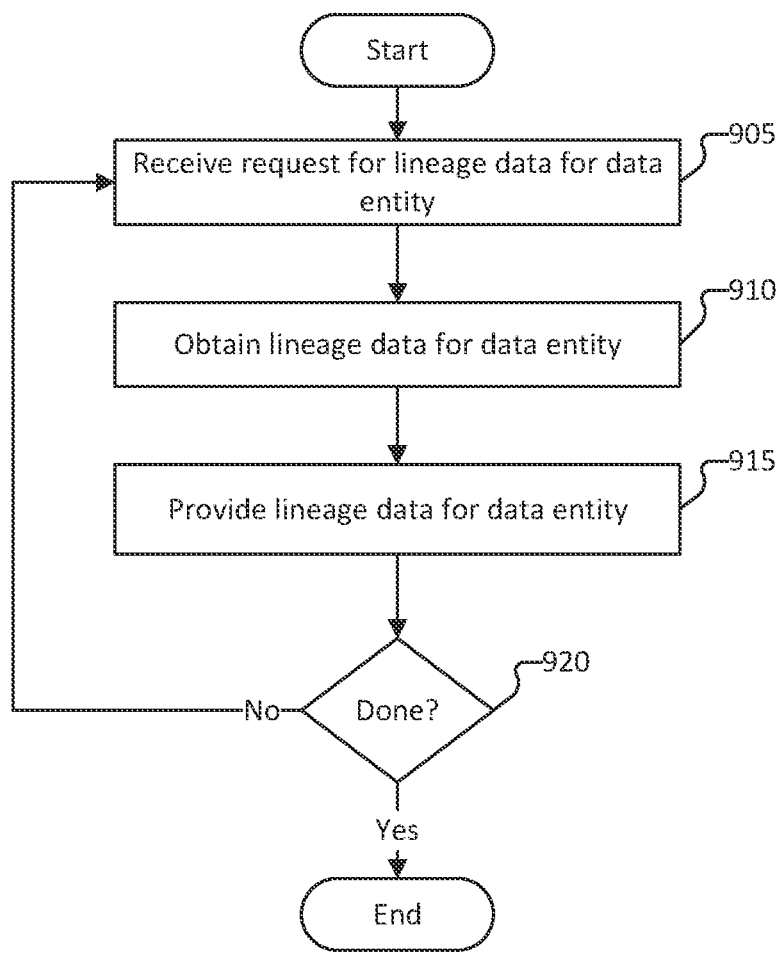
FIG. 9A is a flow diagram of a method for servicing requests for lineage data according to various embodiments of the present application.

FIG. 9A is a flow diagram of a method for servicing requests for lineage data according to various embodiments of the present application. Process 900 is implemented at least in part by system 100 of FIG. 1 and/or system 200 of FIG. 2.

At 905, a request for lineage data for a data entity is received. For example, the request for lineage data can be received from a user (e.g., via a client system) or from another system or process, such as a service/process that is performing a diagnostic or determining a corrective action (e.g., in response to a determination that a particular data entity is corrupted or updated, etc.).

At 910, lineage data for the data entity is obtained. For example, the system can query a dataset for lineage data associated with the data entity (e.g., the system can query the dataset using an identifier for the data entity).

At 915, lineage data for the data entity is provided. In some embodiments, providing the lineage data includes generating and providing a representation of the lineage data that is similar to lineage 300 of FIG. 3A or lineage 350 of FIG. 3B. The lineage data can be provided to the other system or process from which the request for lineage data is received at 905.

At 920, a determination is made as to whether process 900 is complete. In various embodiments, process 900 is determined to be complete in response to a determination that no requests for lineage data are received or are to be serviced, a user has exited the system, an administrator indicates that process 900 is to be paused or stopped, or any other appropriate determination of completeness. In response to a determination that process 900 is complete, process 900 ends. In response to a determination that process 900 is not complete, process 900 returns to 905.

Figure 9B:
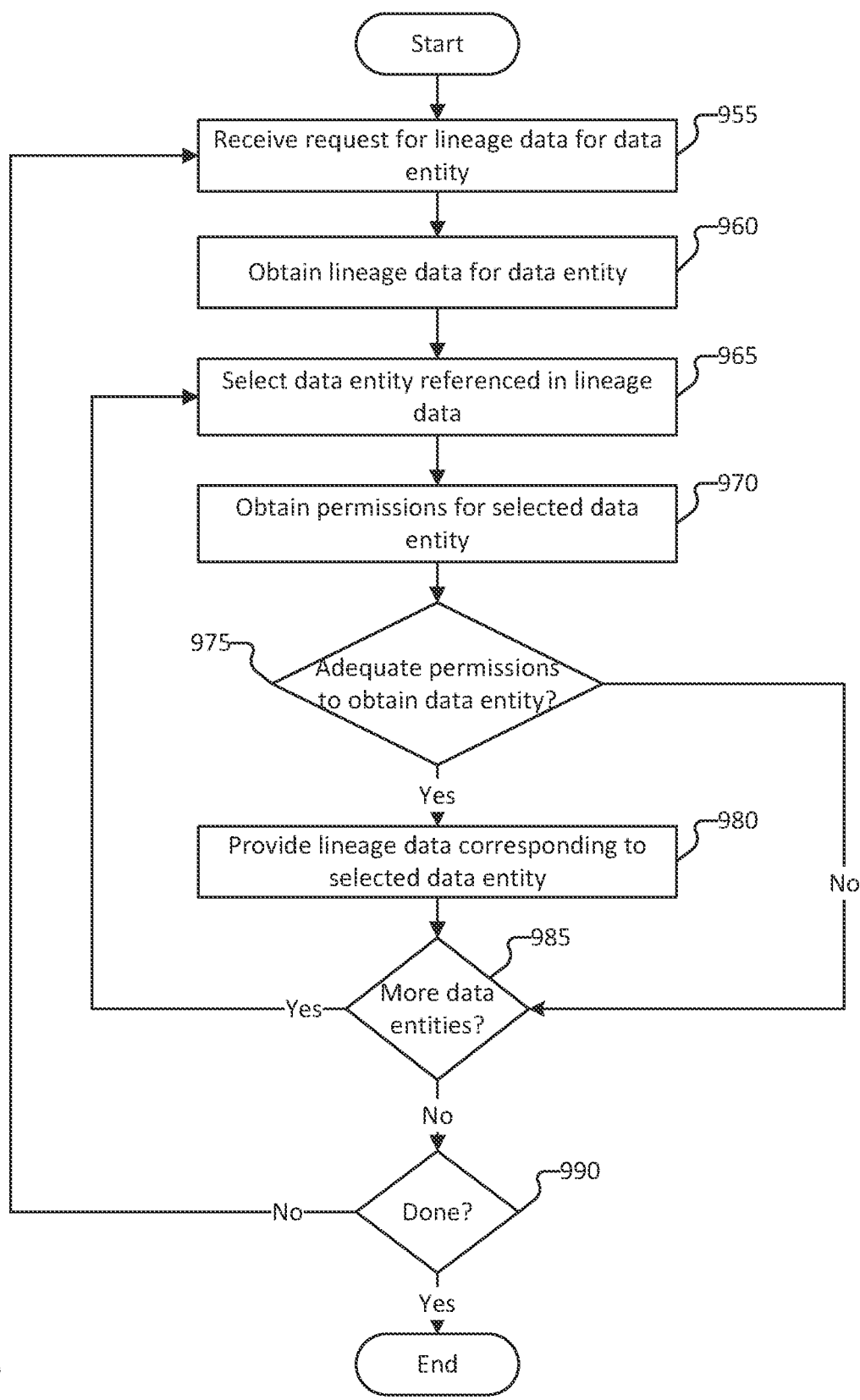
FIG. 9B is a flow diagram of a method for servicing requests for lineage data according to various embodiments of the present application.

FIG. 9B is a flow diagram of a method for servicing requests for lineage data according to various embodiments of the present application. Process 950 is implemented at least in part by system 100 of FIG. 1 and/or system 200 of FIG. 2.

At 955, a request for lineage data for a data entity is received. For example, the request for lineage data can be received from a user (e.g., via a client system) or from another system or process, such as a service/process that is performing a diagnostic or determining a corrective action (e.g., in response to a determination that a particular data entity is corrupted or updated, etc.).

At 960, lineage data for the data entity is obtained.

At 965, a data entity referenced in the lineage data is selected. In response to obtaining the lineage data, the system can provide the linage data to another system or process, such as via a user interface configured to display a representation of the lineage data to a user. The system can receive a selection of a data entity or other interaction with the linage data. In some embodiments, the system configures the representation of the lineage data to be provided to the other system or process based on a set of permissions for such other system or process. For example, the system determines the data entities within the lineage data to provide to a user based on a determination of whether the user has permission to view the data entity.

At 970, permissions for the selected data entity are obtained.

At 975, a determination is made as to whether the requestor from which the request for lineage data is received has requisite permissions to obtain the data entity. For example, the requestor can be a user, a service, or other system that queries a data management service for lineage data.

In response to determining that the requestor has requisite permissions to obtain the data entity associated with the lineage data at 975, process 950 proceeds to 980 at which lineage data for the data entity is provided. In some embodiments, providing the lineage data includes generating and providing a representation of the lineage data that is similar to lineage 300 of FIG. 3A or lineage 350 of FIG. 3B.

In response to determining that the requestor does not have requisite permissions to obtain the data entity associated with the lineage data at 975, process 950 proceeds to 985 at which a determination is made as to whether additional data entities are referenced in the lineage data. For example, the system determines whether the lineage data for the data entity (e.g., referenced in the request for lineage data). In response to determining that additional data entities are referenced in the lineage data at 985, process 950 returns to 965 and process 950 iterates over 965-985 until no further data entities exist in the lineage data. Conversely, in response to determining that no additional entities are referenced in the lineage data at 985, process 950 proceeds to 990.

At 990, a determination is made as to whether process 950 is complete. In various embodiments, process 950 is determined to be complete in response to a determination that no requests for lineage data are received or are to be serviced, a user has exited the system, an administrator indicates that process 950 is to be paused or stopped, or any other appropriate determination of completeness. In response to a determination that process 950 is complete, process 950 ends. In response to a determination that process 950 is not complete, process 950 returns to 955.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A method comprising:
   executing a job on one or more workers of a compute resource, wherein executing the one or more jobs further comprises invoking one or more data entities;
   detecting that a data entity in the one or more data entities is corrupt in response to determination that execution of the job has failed;
   identifying a lineage data identifier associated with the data entity based on a mapping of lineage data identifiers to data entity identifiers;
   accessing lineage data that is stored in association with the identified lineage data identifier, the lineage data having been generated based on a query tree that was used to generate the data entity, and the lineage data identifying a set of data entities that rely on the data entity;
   identifying, based on the lineage data, one or more upstream data entities from the data entity;
   determining that the one or more upstream data entities from which the data entity depends from has been corrupted; and
   providing an indication of the corruption in the one or more upstream data entities or the data entity to a client device.

2. The method of claim 1, further comprising:
   in response to determining that the data entity is impacted by the corruption in the one or more upstream data entities, causing a corrective action to be performed.

3. The method of claim 2, wherein causing the corrective action to be performed comprises:
   replacing the data entity.

4. The method of claim 2, wherein causing the corrective action to be performed comprises:
   recalculating the data entity based on an updated version of the one or more upstream data entities.

5. The method of claim 1, wherein the data entity is a table or a column of a table.

6. The method of claim 1, further comprising:
   obtaining a query that was used to create the data entity;
   parsing the query to generate the query tree;
   generating the data lineage for the data entity based on the query tree; and
   storing the data lineage in association with the data entity.

7. The method of claim 6, wherein generating the lineage data comprises:
   traversing the query tree and extracting a set of lineage data for one or more data entities that are created in the query tree.

8. A system comprising:
   one or more computer processors; and
   one or more computer-readable mediums storing instructions that, when executed by the one or more computer processors, cause the system to perform operations comprising:
      executing a job on one or more workers of a compute resource, wherein executing the one or more jobs further comprises invoking one or more data entities;
      detecting that a data entity in the one or more data entities is corrupt in response to determination that execution of the job has failed;
      identifying a lineage data identifier associated with the data entity based on a mapping of lineage data identifiers to data entity identifiers;
      accessing lineage data that is stored in association with the identified lineage data identifier, the lineage data having been generated based on a query tree that was used to generate the data entity, and the lineage data identifying a set of data entities that rely on the data entity;
      identifying, based on the lineage data, one or more upstream data entities from the data entity;
      determining that the one or more upstream data entities from which the data entity depends from has been corrupted; and
      providing an indication of the corruption in the one or more upstream data entities or the data entity to a client device.

9. The system of claim 8, the operations further comprising:
   in response to determining that the data entity is impacted by the corruption in the one or more upstream data entities, causing a corrective action to be performed.

10. The system of claim 9, wherein causing the corrective action to be performed comprises:
    replacing the data entity.

11. The system of claim 9, wherein causing the corrective action to be performed comprises:
    recalculating the data entity based on an updated version of the one or more upstream data entities.

12. The system of claim 8, wherein the data entity is a table or a column of a table.

13. The system of claim 8, the operations further comprising:
    obtaining a query that was used to create the data entity;
    parsing the query to generate the query tree;
    generating the data lineage for the data entity based on the query tree; and
    storing the data lineage in association with the data entity.

14. The system of claim 13, wherein generating the lineage data comprises:
    traversing the query tree and extracting a set of lineage data for one or more data entities that are created in the query tree.

15. A non-transitory computer-readable medium storing instructions that, when executed by one or more computer processors of one or more computing devices, cause the one or more computing devices to perform operations comprising:
    executing a job on one or more workers of a compute resource, wherein executing the one or more jobs further comprises invoking one or more data entities;
    detecting that a data entity in the one or more data entities is corrupt in response to determination that execution of the job has failed;
    identifying a lineage data identifier associated with the data entity based on a mapping of lineage data identifiers to data entity identifiers;
    accessing lineage data that is stored in association with the identified lineage data identifier, the lineage data having been generated based on a query tree that was used to generate the data entity, and the lineage data identifying a set of data entities that rely on the data entity;
    identifying, based on the lineage data, one or more upstream data entities from the data entity;

determining that the one or more upstream data entities from which the data entity depends from has been corrupted; and providing an indication of the corruption in the one or more upstream data entities or the data entity to a client device.

16. The non-transitory computer-readable medium of claim 15, the operations further comprising:
in response to determining that the data entity is impacted by the corruption in the one or more upstream data entities, causing a corrective action to be performed.

17. The non-transitory computer-readable medium of claim 16, wherein causing the corrective action to be performed comprises:
replacing the data entity.

18. The non-transitory computer-readable medium of claim 16, wherein causing the corrective action to be performed comprises:
recalculating the data entity based on an updated version of the one or more upstream data entities.

19. The non-transitory computer-readable medium of claim 15, wherein the data entity is a table or a column of a table.

20. The non-transitory computer-readable medium of claim 15, the operations further comprising:
obtaining a query that was used to create the data entity;
parsing the query to generate the query tree;
generating the data lineage for the data entity based on the query tree by traversing the query tree and extracting a set of lineage data for one or more data entities that are created in the query tree; and
storing the data lineage in association with the data entity.

* * * * *